Apr. 24, 1923.
R. HERVIG
1,452,506
CAM CHUCK FOR CENTERING VALVES
Filed June 10, 1920
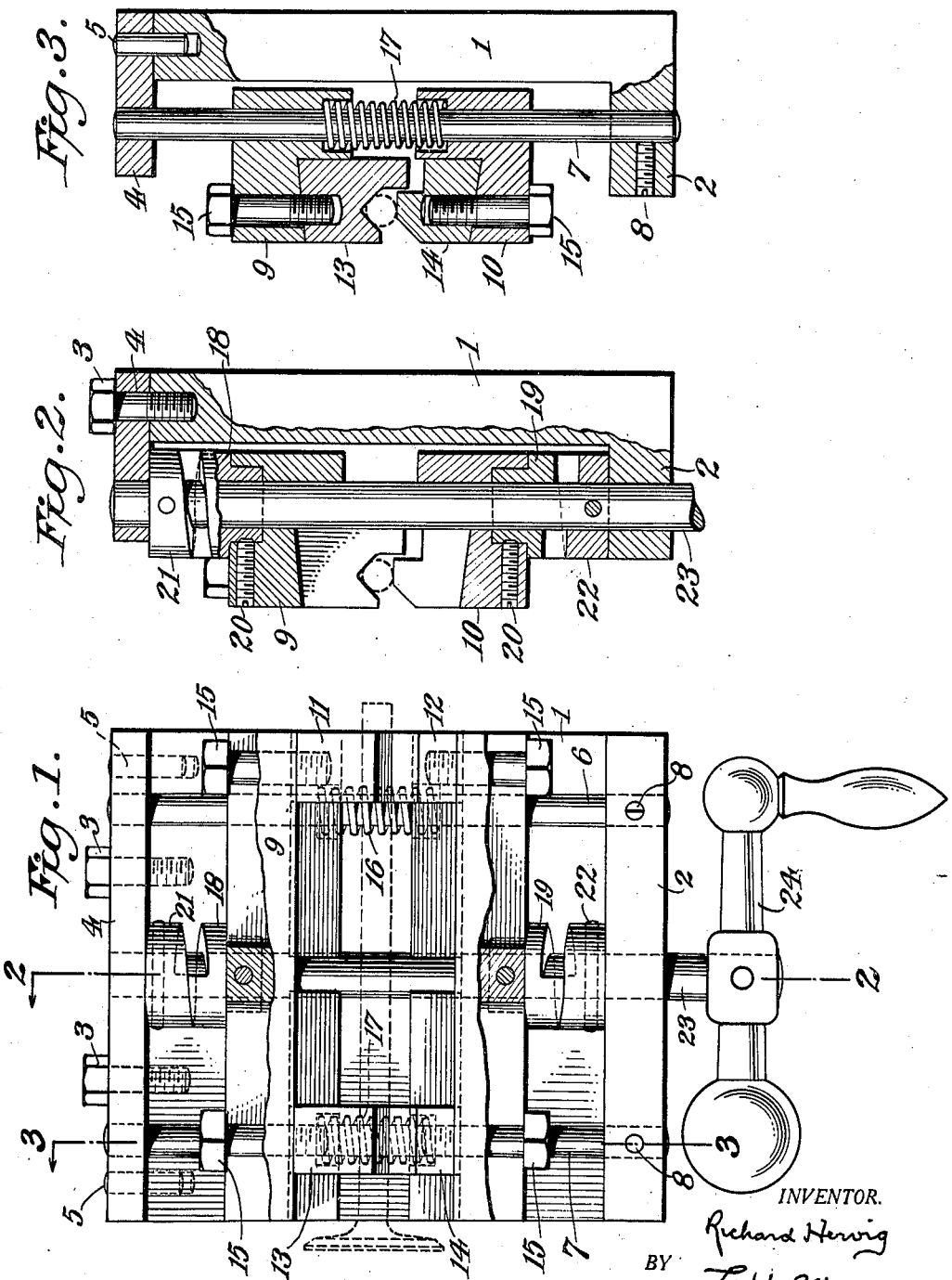
INVENTOR.
Richard Hervig
BY
F. H. Gibbs
ATTORNEY.

Patented Apr. 24, 1923.

1,452,506

UNITED STATES PATENT OFFICE.

RICHARD HERVIG, OF CHICAGO, ILLINOIS, ASSIGNOR TO AMERICAN CAR AND FOUNDRY COMPANY, OF NEW YORK, N. Y., A CORPORATION OF NEW JERSEY.

CAM CHUCK FOR CENTERING VALVES.

Application filed June 10, 1920. Serial No. 388,051.

*To all whom it may concern:*

Be it known that I, RICHARD HERVIG, residing at Chicago, Cook County, Illinois, and being a citizen of the United States, have invented certain new and useful Improvements in a Cam Chuck for Centering Valves, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a view in elevation of my improved centering device, parts being broken away in order to show other parts more clearly;

Figure 2 is partly a section on line 2—2 of Fig. 1 and partly a section showing the means of securing the end piece to the base; and Figure 3 is partly a section on line 3—3 of Fig. 1 and partly a section showing the way the end piece is doweled to the base.

It is the object of my invention to provide an improved chuck for use in connection with centering machines that can be operated quickly and which will hold the work securely.

My invention comprises an L-shaped base member having a back piece 1 and an end piece 2. Secured to the back piece 1 by cap screws 3 is the end piece 4, the end piece 4 being positioned with respect to the back piece 1 by the dowel pins 5 inserted in openings in the end and back pieces. Rods or guides 6 and 7 are mounted in openings in the end pieces 2 and 4 and are secured in place by set screws 8. Mounted on the rods 6 and 7 so as to travel freely thereon are the jaw holders 9 and 10 having inclined seats for the jaws 11, 12, 13 and 14 secured thereto by cap screws 15, the jaws being shaped as shown in Figs. 2 and 3 so as to hold a cylindrical valve stem in position in the tool. Surrounding the rods 6 and 7 and engaging in recesses in the jaw holders 9 and 10 are the springs 16 and 17 which operate to force the jaws apart.

Mounted in recesses in the jaw holders 9 and 10 are the spiral cams 18 and 19. These cams are held against rotation on their seats by set screws 20 and have oppositely disposed faces engaging with corresponding cams 21 and 22 pinned on the rod 23. The rod 23 is mounted to revolve in the end pieces 2 and 4 and extends through the jaw holders 9 and 10 and the cams 18 and 19 and rotates therein. A weighted handle 24 is provided for rotating the rod 23. Rotation of the rod 23 in one direction will rotate the cams 21 and 22 on the fixed cams 18 and 19 respectively, causing the cams 18 and 19 and the jaw holders 9 and 10 to be moved along the rods 6, 7 and 23 against the action of the springs 16 and 17 thus bringing the jaws 13 and 14 together and in position to engage the work. Rotating the rod 23 in the opposite direction will rotate the cams 21 and 22 in the opposite direction on the fixed cams 18 and 19 respectively, permitting the cams 18 and 19 and the jaw holders 9 and 10 to be moved along the rods 6, 7 and 23 by the springs 16 and 17 thus separating the jaws 13 and 14 and releasing the work. The cams and the jaws are so designed that only a part of a turn of the rod 23 is necessary in order to move the jaws sufficiently to either engage or release the work.

What I claim is:

1. In a chuck, a plurality of work engaging jaws, members carrying said jaws, guides for said members, springs surrounding said guides and confined between said members to disengage said jaws from the work and means for forcing said jaws together.

2. In a chuck, a plurality of work engaging jaws, members carrying said jaws, cams fixed on said members, a rod engaging said cams and members, cams on said rod engaging the cams on said members to operate the jaws upon rotation of said rod and automatically operating means to disengage said jaws from the work.

3. In a chuck, jaw carrying members, work engaging jaws carried by said members, guides carrying said members, resilient means carried by said guides for disengaging said jaws from the work, cams carried by said members, a rod engaging said members and said cams and cams operated by said rod and engaging the cams on said members to force the jaws together.

4. In a chuck, jaw carrying members, a plurality of work engaging jaws carried by each member, cams fixed on said members, guides for said members, springs on said guides to disengage said jaws from the work, a rod, cams on said rod engaging the cams on said members and means to operate said rod to rotate the cams carried by said rod and force said jaw carrying members and jaws together.

5. In a chuck, a frame, spaced guides carried by said frame, members mounted on said guides, work engaging jaws carried by said members, means for forcing said jaws together and means surrounding said guides and confined between said members for disengaging said members from the work.

In witness whereof I have hereunto set my hand in the presence of two witnesses.

RICHARD HERVIG.

Witnesses:
R. W. SMITH,
JOSEPHINE MITCHELL.